United States Patent [19]

Miyata

[11] Patent Number: 4,710,551
[45] Date of Patent: Dec. 1, 1987

[54] PROCESS FOR PRODUCING A VINYL CHLORIDE POLYMER OR COPOLYMER IN AQUEOUS SUSPENSION USING A HYDROTALCITE COMPOUND AS SUSPENSION STABILIZER

[75] Inventor: Shigeo Miyata, Takamatsu, Japan

[73] Assignee: Kyowa Chemical Industry Co., Ltd., Tokyo, Japan

[21] Appl. No.: 807,246

[22] Filed: Dec. 10, 1985

[51] Int. Cl.[4] .................................................. C08F 2/18
[52] U.S. Cl. ........................................ 526/91; 526/93; 526/123; 526/140; 526/192; 526/193; 526/194; 526/195
[58] Field of Search ................... 526/93, 91, 192, 120, 526/193, 150, 194, 185, 226

[56] References Cited

U.S. PATENT DOCUMENTS

| | | | |
|---|---|---|---|
| 3,813,373 | 5/1974 | Ito | 526/195 |
| 4,093,787 | 6/1978 | Burgess | 526/233 |
| 4,558,102 | 12/1985 | Miyata | 525/348 |

*Primary Examiner*—Christopher Henderson

*Attorney, Agent, or Firm*—Sherman and Shalloway

[57] ABSTRACT

In a process for producing a polymer or copolymer of a vinyl chloride monomer with or without a comonomer by aqueous suspension polymerization or copolymerization in the presence of a suspension stabilizer and a polymerization initiator which is insoluble or sparingly soluble in water and soluble in the monomer; the improvement wherein the polymerization or copolymerization is carried out in the presence of, as said suspension stabilizer, a hydrotalcite compound of the following formula $$M_{1-x}^{2+}M_x^{3+}(OH)_2A_{x/n}^{n-}\cdot mH_2O \qquad (1)$$

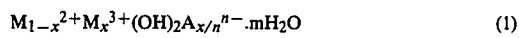

wherein $M^{2+}$ is at least one divalent metal cation, $M^{3+}$ is at least one trivalent metal cation, $A^{n-}$ is an anion having a valence of 1 to 4, and x and m represent numbers satisfying the following expressions $$0 < x < 0.5 \text{ and } 0 \leq m < 2.$$

6 Claims, No Drawings

PROCESS FOR PRODUCING A VINYL CHLORIDE POLYMER OR COPOLYMER IN AQUEOUS SUSPENSION USING A HYDROTALCITE COMPOUND AS SUSPENSION STABILIZER

This invention relates to a process for producing a vinyl chloride polymer or copolymer by aqueous suspension polymerization or copolymerization, and particularly, to an improved process whereby a vinyl chloride polymer or copolymer having markedly improved heat stability can be produced with industrial advantage.

More specifically, this invention pertains, in a process for producing a polymer or copolymer of a vinyl chloride monomer with or without a comonomer by aqueous suspension polymerization or copolymerization in the presence of a suspension stabilizer and a polymerization initiator which is insoluble or sparingly soluble in water and soluble in the monomer, to the improvement wherein the polymerization or copolymerization is carried out in the presence of, as said suspension stabilizer, a hydrotalcite compound of the following formula $$M_{1-x}^{2+}M_x^{3+}(OH)_2A_{x/n}^{n-}\cdot mH_2O \tag{1}$$

wherein $M^{2+}$ is at least one divalent metal cation, $M^{3+}$ is at least one trivalent metal cation, $A^{n-}$ is an anion having a valence of 1 to 4, and x and m represent numbers satisfying the following expressions $$0<x<0.5 \text{ and } 0\leq m<2.$$

It has been known that a polymer or copolymers of vinyl chloride are produced by bulk polymerization or copolymerization, solution polymerization or copolymerization, emulsion polymerization or copolymerization, and suspension polymerization or copolymerization. Among them, the aqueous suspension polymerization or copolymerization technique is most frequently used in the production of a vinyl chloride polymer or copolymer because the inclusion of impurities in the resulting polymer or copolymer is less, the after-treatment step after the polymerization or copolymerization operation is simpler, and a polymer or copolymer of higher quality can be obtained, than the emulsion polymerization.

The present invention pertains to an improvement in such a process for producing a polymer or copolymer of a vinyl chloride monomer with or without a comonomer by aqueous suspension polymerization or copolymerization in the presence of a suspension stabilizer and a polymerization initiator which is insoluble or sparingly soluble in water and soluble in the monomer.

Suspension stabilizers used in the prior practice of such suspension polymerization or copolymerization include, for example, water soluble polymeric substances such as gelatin, tragacanth gum, starch, methyl cellulose, carboxymethyl cellulose, partially saponified polyvinyl alcohol, polyethylene oxide and polyacrylic acid salts, and sparingly water-soluble fine powdery inorganic substances such as barium sulfate, calcium sulfate, barium carbonate, calcium carbonate, magnesium carbonate, calcium phosphate, talc, bentonite, diatomaceous earth and clay. On the other hand, organic peroxides or azo nitriles are used as the polymerization initiator.

In the prior art, the desired vinyl chloride polymer or copolymer is separated from the suspension polymerization or copolymerization product by subjecting it to after-treatment steps such as a stripping step of removing the unreacted monomer and the unreacted comonomer (in the case of copolymerization), a step of separating the resulting polymer or copolymer from the aqueous medium by such means as centrifugal separation, and a drying step of drying the polymer or copolymer after washing.

Since the vinyl chloride polymer or copolymer inherently has low heat stability, it is liable to undergo thermal decomposition partly by heat encountered during the stripping step, the drying step, etc. Accordingly, a special care must be exercised in carrying out these after-treatment steps so that the polymer or copolymer will not undergo heating at about 60° C. or higher for a substantial period of time. In addition to this disadvantage, even by taking such a care, the vinyl polymer or copolymer which has been subjected to the drying treatment usually has reduced thermal stability as a result of its partial decomposition during the drying.

It is known to incorporate a hydrotalcite of the formula $Mg_{1-x}Al_x(OH)_2A_{x/n}^{n-}\cdot mH_2O$ (wherein $A^{n-}$ is an anion having a valence of n, m is a positive number, and x is $0<x\leq 0.5$) in order to prevent thermal and ultraviolet degradation of thermoplastic resins containing halogen and/or acidic substances, such as the vinyl chloride resin obtained through the after-treatment steps as described above (Japanese Patent Publication No. 46146/1983). This patent document, however, totally fails to describe or suggest the problem of heat stability in the production of the vinyl chloride resins and a solution to it.

The present inventor has endeavored to develop a process for producing a vinyl chloride polymer or copolymer by aqueous suspension polymerization or copolymerization which can circumvent the aforesaid trouble of degradation of the heat stability of the polymer or copolymer. Consequently, it has been found that the above trouble can be markedly circumvented by using the hydrotalcite compound of formula (1) as a suspension stabilizer in the production of a vinyl chloride or copolymer by aqueous suspension polymerization or copolymerization.

It has also been found unexpectedly that the vinyl chloride polymer or copolymer obtained by aqueous suspension polymerization or copolymerization in the presence of the hydrotalcite compound of formula (1) as the suspension stabilizer shows much higher heat stability than a mixture of a vinyl chloride polymer or copolymer obtained by a conventional method with the hydrotalcite compound. It has also been found that the hydrotalcite compound of formula (1) has excellent dispersibility in the polymer or copolymer, and the resulting polymer or copolymer has increased transparency.

It is an object of this invention therefore to provide an improved process for producing a vinyl chloride polymer or copolymer having the aforesaid improvements, especially markedly improved heat stability, by aqueous suspension polymerization or copolymerization in the presence of a particular hydrotalcite compound.

The above and other objects and advantages of this invention will become more apparent from the following description.

It is well known to those skilled in the art to produce a polymer or copolymer of a vinyl chloride monomer with or without a comonomer by aqueous suspension polymerization or copolymerization in the presence of a suspension stabilizer and a polymerization initiator which is insoluble or sparingly soluble in water and soluble in the monomer. The characteristic essential feature of the present invention is that the above known process is carried out in the presence of the hydrotalcite compound of formula (1) as the suspension stabilizer. The use of the hydrotalcite (1) as the suspension stabilizer in such a known process has heretofore been quite unknown. Except as noted above, the process of this invention can be carried out by properly utilizing the known techniques of aqueou suspension polymerization or copolymerization. The process of this invention can be applied not only to the homopolymerization of vinyl chloride, but also to the copolymerization of vinyl chloride with comonomers. Examples of the comonomers include olefins, particularly olefins having 2 to 8 carbon atoms such as ethylene and propylene, and other vinyl or vinylidene compounds such as vinylidene chloride, vinyl acetate and styrene. The copolymerization may, for example, be the random copolymerization of vinyl chloride with at least one comonomer, and graft copolymerization such as the graft copolymerization of vinyl chloride and ethylene/vinyl acetate copolymer or the graft copolymerization of vinyl chloride and ethylene/propylene copolymer. The proportion of the vinyl chloride monomer is preferably at least 20 mole %, especially at least 30 mole %, and above all at least 50 mole %.

The hydrotalcites of formula (1) and methods for their production are well known, and many of such compounds are commercially available. The methods for production of the hydrotalcite compounds of formula (1) are described, for example, in Japanese Patent Publications Nos. 32198/1972, 3760/1974, 29129/1976, 3353/1977, 19555/1978 and 29893/1981.

The hydrotalcite compounds utilized in this invention can be represented by the following formula (1).

$$M_{1-x}^{2+}M_x^{3+}(OH)_2 A_{x/n}^{n-} \cdot mH_2O \quad (1)$$

wherein $M^{2+}$ is at least one divalent metal cation, $M^{3+}$ is at least one trivalent metal cation, $A^{n-}$ is an anion having a valence of 1 to 4, and x and m represent numbers satisfying the following expressions $$0 < x < 0.5 \text{ and } 0 \leq m < 2.$$

In the above formula, examples of $M^{2+}$ are divalent cations of metals selected, for example, from Mg, Ca, Sr, Ba, Zn, Cd, Pb, Sn, Co, Mn and Ni. $M^{2+}$ may consist of two or more such cations, in which case $1-x$ means the total number of these cations. Examples of $M^{3+}$ are trivalent cations of metals selected, for example, from Al, In, B, Bi, Fe and Cr. $M^{3+}$ may consist of two or more such cations, in which case x means the total number of such cations.

In the above formula, $A^{n-}$ represents an anion having a valence of 1 to 4, and examples include $HCO_3^-$, $OH^-$, $F^-$, $Cl^-$, $I^-$, $Br^-$, $ClO_4^-$, $CO_3^{2-}$, $SiO_3^{2-}$, $HPO_4^{2-}$, $CH_3COO^-$, $C_6H_5COO^-$,

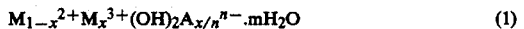

and a citrate ion.

The hydrotalcite compounds used as the suspension stabilizer in this invention preferably have an average crystal particle diameter of 0.01 to 1 micrometer and an average secondary particle diameter of 0.01 to 1 micrometer. Preferably, the hydrotalcite compounds further have a BET specific surface area of at least 5 m²/g, for example about 5 to about 60 m²/g, especially about 10 to about 30 m²/g. Furthermore, it is preferred that the hydrotalcite compounds be surface-treated with colloidal silica or an anionic surface-active agent prior to use. The same anionic surface-active agents as described hereinbelow as examples of a stabilization aid for the suspension stabilizer or a particle size adjusting agent for the resulting vinyl chloride polymer or copolymer may be used as the anionic surface-active agent for this surface treatment. Examples of preferred surface-active agents are high fatty acids having 8 to 29 carbon atoms or salts thereof such as caprylic acid, stearic acid, oleic acid, lauric acid, and their alkali metal or alkaline earth metal salts such as sodium, potassium, and calcium salts; alkylarylsulfonic acid salts such as sodium laurylbenzenesulfonate and sodium laurylnaphthalene sulfonate; and alkali salts of polyphosphoric acids such a sodium hexametaphosphate and sodium tetrametaphosphate.

The hydrotalcite compounds may be surface-coated with colloidal silica or the above-exemplified anionic surface-active agents by techniques known per se. For example, it can be carried out by adding colloidal silica or the anionic surface-active agent to an aqueous suspension of the hydrotalcite compound, and stirring the mixture at a temperature of, for example, 10° to 90° C. The amount of the surface-treating agent used can be selected as desired. For example, it is about 0.1 to about 10% by weight, preferably 0.5 to 5% by weight, based on the weight of the hydrotalcite compound.

In the present invention, the aqueous suspension polymerization or copolymerization can be carried out by techniques known per se. For example, vinyl chloride with or without a comonomer is introduced into an aqueous medium containing the hydrotalcite compound as the suspension stabilizer and the polymerization initiator and optionally, other additives such as another suspension stabilizer, a viscosity adjusting agent, a particle size adjusting agent for the resulting polymer or copolymer, a filler or a solubility adjusting agent, and is polymerized or copolymerized at a temperature of, for example, about 40° to about 100° C. for a period of time of, for example, about 2 to about 24 hours.

The amount of water in the reaction system can be selected as desired. For example, it is about 1 to about 8 parts by volume, preferably about 1 to about 3 parts by volume, per part by volume of the vinyl chloride monomer with or without a comonomer.

The amount of the hydrotalcite compound as a suspension stabilizer can also be selected as desired. For example, it is about 0.05 to about 5% by weight, preferably about 0.1 to about 2% by weight, more preferably about 0.2 to about 1.5% by weight, based on the weight of the vinyl chloride monomer with or without a comonomer.

The polymerization initiator used in the process of this invention may be any of organic peroxides and azonitriles known per se. Specific examples of such a polymerization initiator include organic peroxides such as tert-butyl peroxypivalate, lauroyl peroxide, benzoyl peroxide, cyclohexanone peroxide, tert-butyl peroxybenzoate and dicumyl peroxide, and azonitriles such as azobisisobutyronitrile and azobisdimethylvaleronitrile.

These initiators may be used singly or in combination. The amount of the polymerization initiator may be selected as desired, and is, for example, about 0.01 to 1% by weight, preferably about 0.3 to 0.8% by weight, based on the weight of the vinyl chloride monomer with or without a comonomer.

Examples of the other suspension stabilizer are the water-soluble polymeric substances and sparingly water-soluble fine powdery inorganic substances given hereinabove as examples of conventional suspension stabilizers.

Examples of the other additives include viscosity adjusting agents such as glycerol and polyethylene glycol; fillers such as polyethylene, polypropylene, polyamides, polyethylene terephthalate, ethylene/vinyl acetate copolymer and polycarbonate; and solubility adjusting agents such as sodium chloride, potassium chloride and sodium sulfate. The amounts of the other additives may be selected as desired. For example, the amounts may be about 0.01 to about 3% by weight for the other suspension stabilizers, about 0.1 to about 5% by weight for the viscosity adjusting agents, about 0.1 to about 10% by weight for the fillers, and about 0.1 to about 5% by weight for the solubility adjusting agents, all based on the weight of the vinyl chloride monomer with or without a comonomer.

In the practice of the process of this invention, anionic surface-active agents may be used preferably as a stabilization aid for the suspension stabilizer or as a particle size adjusting agent. The amount of such an anionic surface-active agent is not particularly limited, and is, for example, about 0.1 to about 10% by weight, preferably about 0.5 to about 5% by weight, based on the weight of the hydrotalcite compound. Examples of the anionic surface-active agents are higher fatty acids having 8 to 29 carbon atoms and salts thereof, such as caprylic acid, stearic acid, olefic acid, lauric acid, and sodium, potassium and calcium salts thereof; higher alcohol sulfuric acid ester salts such as lauryl alcohol sulfate sodium salt; liquid fatty oil sulfuric acid ester salts such as dehydrated castor oil sulfate sodium salt; aliphatic amine sulfuric acid salts such as lauryl triethanolamine sulfate; aliphatic amide sulfuric acid salts such as a compound of the formula

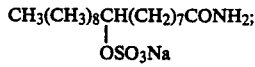

aliphatic alcohol phosphoric acid ester salts such as a compound of the formula

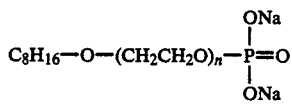

silicic acid salts and sulfuric acid salts; sulfonic acid salts of dibasic fatty acid esters such as sodium dioctylsulfosuccinate and sodium dilaurylsulfosuccinate; fatty acid amide sulfonic acid salts such as oleyl methyl taurin acid sodium salt; alkylarylsulfonic acid salts such as sodium laurylbenzenesulfonate and sodium laurylnaphthalenesulfonate; and formaldehyde condensates of naphthalenesulfonic acid salts such as a compound represented by the following formula

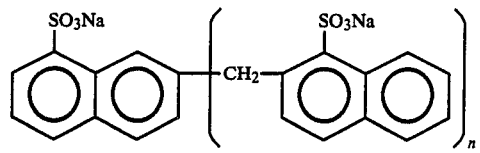

In the practice of the process of this invention, sodium polyphosphates such as sodium hexametaphosphate and sodium tri- or tetra-metaphosphate, and sodium polysilicates such as sodium disilicate and sodium tetrasilicate may be added in an amount of, for example, about 0.1 to about 10% by weight, based on the hydrotalcite. The following examples illustrate the present invention more specifically. All parts in these examples are by weight.

EXAMPLE 1

A 3-liter autoclave was charged with 1 liter of water and 25 g (0.5 part per 100 parts of monomer) of a 10% aqueous slurry of a hydrotalcite having an average crystal particle diameter of 0.1 micrometer, an average secondary particle diameter of 0.2 micrometer, a BET specific surface area of 30 m$^2$/g, and the composition formula $Mg_{0.68}Al_{0.32}(OH)_2(CO_3)_{0.16} \cdot 0.4H_2O$, and with stirring 0.1 g of colloidal silica was added. The mixture was thoroughly stirred for about 5 minutes to coat the crystal surface of the hydrotalcite compound. Then, 1.5 g of lauryl peroxide was introduced into the autoclave, and the inside of the autoclave was evacuated. With stirring, 500 g of a vinyl chloride monomer was introduced into the autoclave. The reaction mixture was heated to 56° C. and maintained at this temperature for 12 hours. After cooling, the contents of the autoclave were taken out and filtered to separate the resulting polymer. It was dried to give about 475 g of polyvinyl chloride.

The resulting polyvinyl chloride was subjected to the following heat stability tests, and the results are shown in Table 1. The testing methods are the same in all the (1) Roll Mill Testing Method

| Ingredient | Amounts (parts) |
| --- | --- |
| Polyvinyl chloride | 100 |
| Octyltin mercaptide | 0.2 |
| Stearyl alcohol | 0.5 |
| Butyl stearate | 0.5 |

A composition composed of the above ingredients was kneaded by a roll mill at 180° C. for 5 minutes. The coloration of the resulting 2 mm-thick sheet was examined. Furthermore, the sheet was put in an oven at 190° C., and the time which elapsed until it was blackened was measured. The longer this time, the higher the heat stability of the sheet.

(2) Congo Red Test Paper Method

Two grams of polyvinyl chloride was put in a test tube having a diameter of 15 cm, and Congo Red test paper wetted with glycerol was attached to the upper part of the test tube. The test tube was immersed in an oil bath at 200° C., and the time which elapsed until the Congo Red paper turned blue was measured. The longer this time, the higher the heat stability of the polymer.

EXAMPLE 2

Fifty grams (1 part per 100 parts of monomer) of a 10% aqueous slurry of a hydrotalcite compound having an average crystal particle diameter of 0.3 micrometer, an average secondary particle diameter of 0.34 micrometer, a BET specific surface area of 14 m$^2$/g and the composition formula $Mg_{0.45}Zn_{0.25}Al_{0.3}(OH)_2(CO_3)_{0.15} \cdot 0.55H_2O$ was introduced into a 3-liter autoclave containing 1 liter of water. With stirring, 0.04 g of sodium laurylbenzenesulfonate was added to coat the crystal surface of the hydrotalcite compound. Thereafter, by the same operation as in Example 1, vinyl chloride was polymerized. The heat stability and the color of the resulting polymer are shown in Table 1.

EXAMPLE 3

Example 1 was repeated except that 1.0 g (0.2 part per 100 parts of monomer) of a dry powder of a hydrotalcite compound having an average crystal particle diameter of 0.2 micrometer, an average secondary particle diameter of 0.2 micrometer, a BET specific surface area of 21 m$^2$/g and the composition formula $Zn_{0.6}Al_{0.4}(OH)_2(CO_2)_{0.2} \cdot 0.46H_2O$ was used as the suspension stabilizer and 0.05 g of sodium hexametaphosphate was used instead of the colloidal silica used in Example 1. The heat stability and the color of the resulting polyvinyl chloride are shown in Table 1.

EXAMPLE 4

Example 1 was repeated except that 30 g (1.5 parts per 100 parts of monomer) of a 25% cake of a hydrotalcite compound having an average crystal particle diameter of 0.4 micrometer, an average secondary particle diameter of 0.4 micron, a BET specific area of 18 m$^2$/g and the composition formula $Mg_{0.5}Cd_{0.2}Al_{0.3}(OH)_2(SO_4)_{0.15} \cdot 0.4H_2O$ was used as the suspension stabilizer and 0.1 g of sodium oleate was used instead of the colloidal silica. The heat stability and the color of the resulting polyvinyl chloride are shown in Table 1.

EXAMPLE 5

Example 1 was repeated except that 5 g (0.1 part per 100 parts of monomer) of a 10% slurry of a hydrotalcite compound having an average crystal particle diameter of 0.05 micrometer, an average secondary particle diameter of 0.1 micron, a BET specific area of 60 m$^2$/g and the composition formula $Mg_{0.3}Ni_{0.4}Al_{0.3}(OH)_2Cl_{0.3} \cdot 0.14H_2O$ was used as the suspension stabilizer and 0.1 g of caprylic acid was used instead of the colloidal silica. The heat stability and the color of the resulting polyvinyl chloride are shown in Table 1.

COMPARATIVE EXAMPLE 1

Example 1 was repeated except that 0.5 g of saponified polyvinyl alcohol was used instead of the hydrotalcite, and the colloidal silica was not used. The heat stability and the color of the resulting polyvinyl chloride were measured, and the results are shown in Table 1.

COMPARATIVE EXAMPLE 2

The same hydrotalcite as used in Example 1 (0.5 part by weight) was added to 100 parts of dry polyvinyl chloride obtained as in Comparative Example 1, and then in accordance with the roll mill testing method described in Example 1, 0.2 part of octyltin mercaptide, 0.5 part of stearyl alcohol and 0.5 part of butyl stearate were added. The mixture was kneaded by a roll mill at 180° C. for 5 minutes to prepare a sheet. The color and the heat stability of the sheet are shown in Table 1.

TABLE 1

| Example (Ex.) or Comparative Example (CEx.) | Heat stability by the Congo Red test (minutes) | Roll mill test Heat stability (minutes) | Roll mill test Color of the polymer sheet |
| --- | --- | --- | --- |
| Ex. 1 | 17 | 30 | White |
| Ex. 2 | 32 | 45 | White |
| Ex. 3 | 6 | 20 | White |
| Ex. 4 | 38 | 55 | White |
| Ex. 5 | 4 | 15 | White |
| CEx. 1 | 1 | 5 | Yellow |
| CEx. 2 | — | 20 | White |

What is claimed is:

1. In a process for producing a polymer or copolymer of a vinyl chloride monomer with or without a comonomer by aqueous suspension polymerization or copolymerization in the presence of a suspension stabilizer and a polymerization initiator which is insoluble or sparingly soluble in water and soluble in the monomer; the improvement comprising carrying out the polymerization or copolymerization in the presence of, as said suspension stabilizer, a hydrotalcite compound of the following formula $$M_{1-x}^{2+}M_x^{3+}(OH)_2 A_{x/n}^{n-} \cdot mH_2O \qquad (1)$$

wherein $M^{2+}$ is a divalent cation of a metal selected from the group consisting of Mg, and the combinations of Mg and Zn, and Mg and Cd, $M^{3+}$ is at least one trivalent metal cation, $A^{n-}$ is an anion having a valence of 1 to 4, and x and m represent numbers satisfying the following expressions $$0 < x < 0.5 \text{ and } 0 \leq m < 2.$$

2. The process of claim 1 wherein $M^{3+}$ in formula (1) is a trivalent cation of a metal selected from the group consisting of Al, In, B, Fe, Cr and Bi.

3. The process of claim 1 wherein the hydrotalcite compound is surface-coated with colloidal silica or an anionic surface-active agent.

4. The process of claim 1 wherein the hydrotalcite compound has an average crystal particle diameter of 0.01 to 1 micrometer and an average secondary particle diameter of 0.01 to 1 micrometer.

5. The process of claim 1 wherein $A^{n-}$ in formula (1) is an anion selected from the group consisting of $HCO_3^-$, $OH^-$, $F^-$, $Cl^-$, $I^-$, $Br^-$, $ClO_4^-$, $CO_3^{2-}$, $SiO_3^{2-}$, $HPO_4^{2-}$, $CH_3COO^-$, $C_6H_5COO^-$,

and a citrate ion.

6. The process of claim 1 wherein the amount of the hydrotalcite compound is about 0.05 to about 5% by weight based on the weight of the monomer or the total weight of the monomer and the comonomer.

* * * * *